Figure 1:
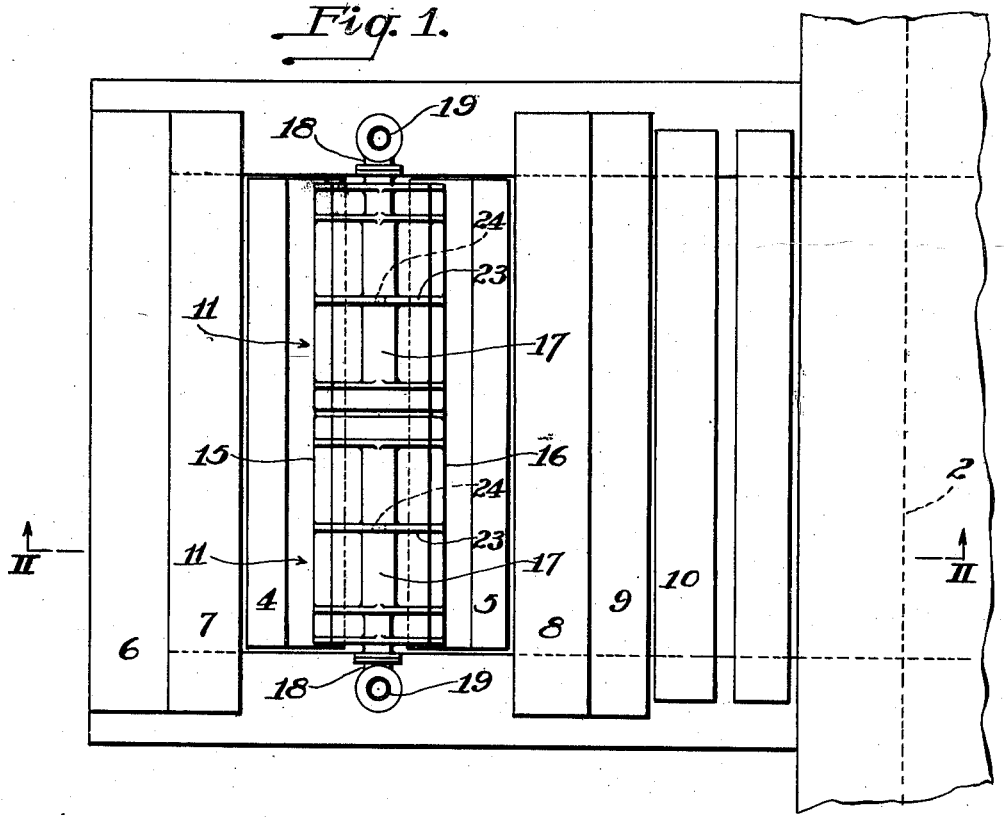

Aug. 17, 1926. 1,596,666
K. G. KUTCHKA
GLASS TANK CONSTRUCTION
Filed Dec. 10, 1925 2 Sheets-Sheet 1

INVENTOR
K. G. Kutchka
by
J. C. Bradley

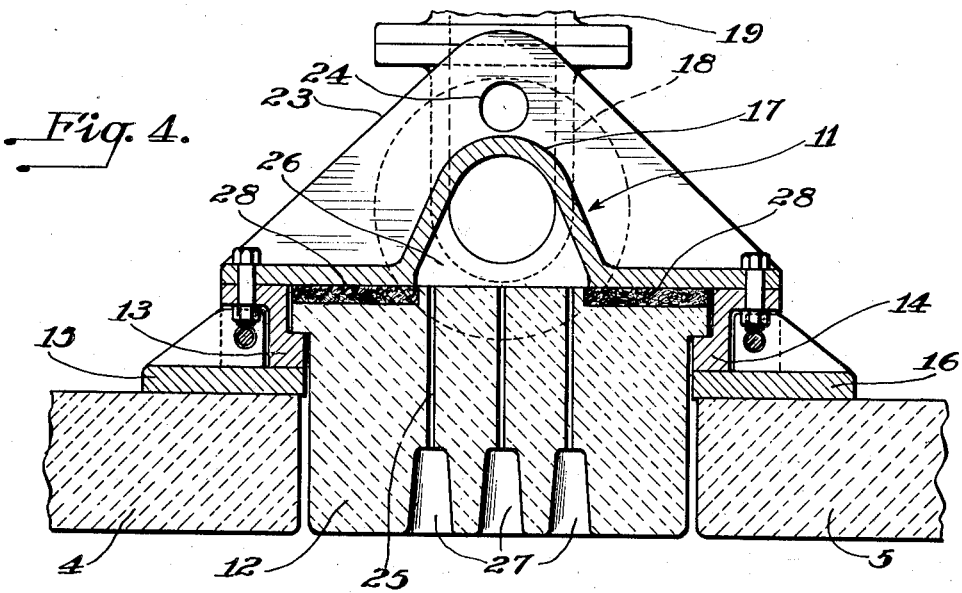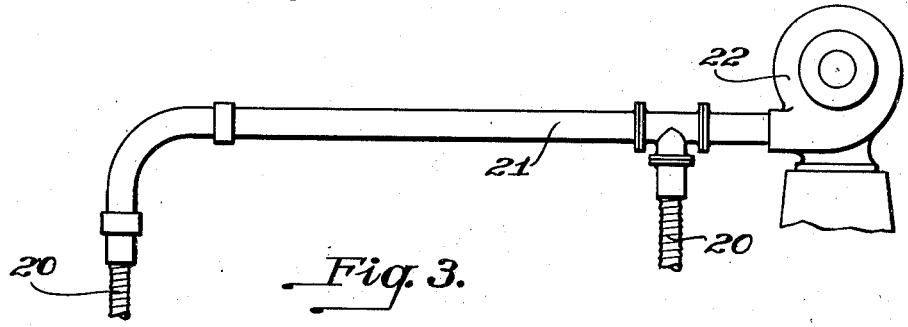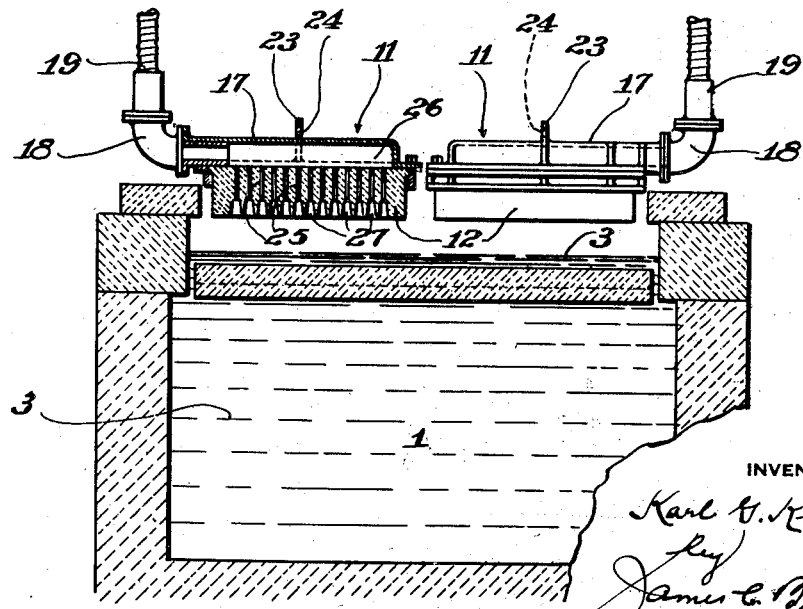

Patented Aug. 17, 1926.

1,596,666

UNITED STATES PATENT OFFICE.

KARL G. KUTCHKA, OF WILKINSBURG, PENNSYLVANIA, ASSIGNOR TO PITTSBURGH PLATE GLASS COMPANY, A CORPORATION OF PENNSYLVANIA.

GLASS TANK CONSTRUCTION.

Application filed December 10, 1925. Serial No. 74,556.

Figure 2:
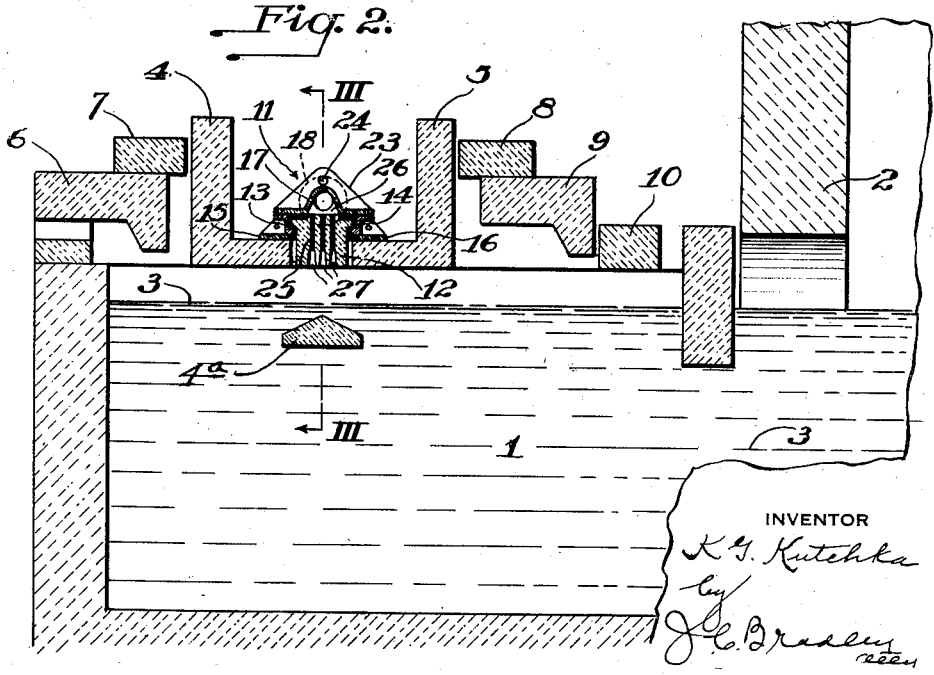

The invention relates to a glass tank construction, and more particularly to the forehearth or drawing tank, as used in the manufacture of window glass, although the invention is not limited to use in such construction. The invention is illustrated as applied to the lid or closure of the drawing opening, but is applicable to the top wall or arch of any glass tank or furnace, where it is desired to heat the glass rapidly from above. In the manufacture of glass from a tank by the cylinder process, it is necessary to remelt or recondition the glass in the forehearth after each cylinder is drawn, in order to put the glass bath in condition for the next draw. Similarly, in the drawing of a sheet continuously from the bath, it becomes necessary after several hours to discontinue the draw, cover the drawing opening, and bring the temperature of the body of glass up a substantial amount before starting another draw. The embodiment of the invention here illustrated and described, is designed to facilitate this reheating operation, and reduce the time required to a minimum. Briefly stated, this construction involves a heating arrangement for the cover or lid of the drawing opening, to which heating means are applied, so that a great degree of heat may be directed upon the surface of the bath from which the draw has just been made, and which comprises that portion of glass in the furnace having the lowest temperature. This is preferably accomplished by the inducing of surface combustion on the lower face of the lid, bringing it to a white heat in opposition to the glass to be reduced immediately beneath; but it will be understood that the invention is not limited to use of surface combustion, either in part or in whole, although this is preferred, because of the greater temperature available and because of the greater economy involved. One embodiment of the invention is illustrated in the accompanying drawings wherein:

Figure 1 is a plan view of a drawing tank with the improvement applied thereto. Fig. 2 is a vertical section through the drawing tank on the line II—II of Fig. 1. Fig. 3 is a vertical section through the tank on the line III—III of Fig. 2, with one half of the cover or top shown in side elevation. And Fig. 4 is an enlarged section through the cover member or plate.

Referring to the drawings, 1 is a forehearth or drawing tank having communication at its right hand end (Fig. 2) with a melting tank, the end wall 2 only of which is shown. The glass level in the tank is indicated by the line 3, and beneath this level is preferably located a refractory bar 4ª to act as a guide for the sheet which is drawn from a point above the bar by suitable drawing means, not shown Spaced above the surface of the glass is the top of the tank, including the L-shaped refractory members 4 and 5 and the refractory members 6, 7, 8, 9 and 10. The space between the horizontal flanges of the L-shaped members 4 and 5 constitutes the drawing opening, such drawing opening being illustrated as closed for the remelting operation by the cover members 11, 11. Each cover member consists of a refractory plate 12, preferably clay reenforced, and supported by the metal side members 13 and 14, to which are secured the metal plates 15 and 16 adapted to rest on the horizontal flanges of the members 4 and 5. Two cover members 11, 11 are employed instead of a single member to facilitate handling, as the weight of these parts is very considerable.

Bolted to the tops of the reenforcing members 13 and 14 are the manifolds 17, 17, each having an elbow 18 at its end, to which is detachably secured a connection 19 including a flexible pipe 20 The flexible pipes are supplied with a combustible mixture under pressure by the connection 21 supplied by a suitable fan 22. Each manifold is provided with a rib 23 which is perforated, as indicated at 24, for the insertion of a hook, by means of which the cover sections may be moved into and out of position from an overhead crane, not shown.

The refractory plate 12 is provided with a plurality of vertical passages 25 of small diameter leading from the space 26 inside the manifold 17 (Fig. 4) down to a point adjacent the lower face of the plate where they terminate in enlargements 27 which serve as combustion recesses. In operation, the combustible mixture of gas and air is supplied through the passages 25 under relatively high pressure and combustion occurs in the recesses 27 and over the lower face of the plate 12. The flow of the gas and air under relatively high pressure through the small passages 25 serves to secure a very intimate mixture of the gas and air, and this mixture in burning permeates the surface of the clay surrounding the recesses 27 and also the surface constituting the lower face of the plate 12, so that an intense surface combustion occurs, bringing the lower side of the plate and the interiors of the recesses to an incandescent heat. Under these conditions of surface combustion, a much higher temperature is secured than would otherwise be possible with ordinary Bunsen burners and the economy of fuel is very substantially increased. This intense heat applied immediately above the surface of the glass from which the drawing has occurred, very quickly reduces the glass to the same condition as the body of glass in the tank 1, so that in a very short time, the glass is in condition for another draw and the cover members may be removed and a new draw instituted.

In order to prevent a leakage of gas and air between the lower faces of the manifold members 17 and the upper faces of the clay plates 12, the refractory packing 28 of asbestos or other suitable material is employed, which packing also serves the additional function of insulating the upper face of the clay plate 12 from the surface of the manifold, so that the injury to the manifold due to the high temperature of the clay is avoided.

What I claim is:

1. The combination with a glass tank, of a refractory top member in opposition to the surface of the glass provided with a plurality of passages leading downward through said member, and means for supplying a mixture of gas and air through said passages.

2. The combination with a glass tank, of a refractory top member in opposition to the surface of the glass provided with a plurality of passages leading downward through said member, and having downwardly opening enlargements at their lower ends, and means for supplying a mixture of gas and air through said passages.

3. The combination with a glass drawing tank having a refractory roof or closure above the glass with a drawing opening therethrough, of a removable cover plate of refractory material for said opening provided with a plurality of passages leading downward therethrough, and means for supplying a mixture of gas and air through said passages.

4. The combination with a glass drawing tank having a refractory roof or closure above the glass with a drawing opening therethrough, of a removable cover plate of refractory material for said opening provided with a plurality of passages leading downward therethrough, and having downwardly opening enlargements at their lower ends, and means for supplying a mixture of gas and air through said passages.

5. The combination with a glass tank, of a refractory top member in opposition to the surface of the glass, and having its lower face recessed so as to promote surface combustion, and means for supplying a mixture of gas and air to such recessed face, so as to secure surface combustion over the surface thereof.

6. The combination with a glass drawing tank having a refractory roof or closure above the glass with a drawing opening therethrough, of a removable cover plate of refractory material for said opening having its lower face recessed so as to promote surface combustion, and means for supplying a mixture of gas and air to said recessed face, so as to secure surface combustion over the surface thereof.

7. The combination with a glass tank, of a refractory top member in opposition to the surface of the glass, and having its lower face recessed so as to promote surface combustion, and means for supplying a mixture of gas and air through said member to such recessed face, so as to secure surface combustion over the surface thereof.

In testimony whereof, I have hereunto subscribed my name this 5th day of December, 1925.

KARL G. KUTCHKA.